United States Patent Office 3,541,108
Patented Nov. 17, 1970

3,541,108
ISOTHIAZOLE DERIVATIVES
Karl Günther Schmidt, Günther Mohr, and Sigmund Lust, Darmstadt, and Walter Wirtz, Darmstadt-Eberstadt, Germany, assignors to E. Merck A.G., Darmstadt, Germany
No Drawing. Filed Apr. 5, 1967, Ser. No. 628,569
Claims priority, application Germany, Apr. 6, 1966, M 69,057; Mar. 3, 1967, M 73,010
Int. Cl. A01n 9/12; C07d 91/12
U.S. Cl. 260—306.8
7 Claims

ABSTRACT OF THE DISCLOSURE

N-substituted derivatives of 3-chloro-4-cyano-5-amino-isothiazoles suitable as insecticides.

Applicants hereby claim the benefit of the filing dates of German patent applications Ser. No. M 69,057 IVd/12p, filed Apr. 6, 1966, and M 73,010 IVa/45 1, of March 3, 1967.

This invention relates to derivatives of 4-cyano-isothiazole which are particularly suitable as insecticides and/or herbicides.

An object of this invention is to provide novel chemical compounds as well as processes and intermediates therefor.

Another object is to provide insecticidal and herbicidal compositions.

Still another object is to provide processes for effecting insecticidal or herbicidal activities.

Upon further study of the specification and claims, other objects and advantages of the present invention will become apparent.

To attain the objects of this invention, there are provided the compounds of Formula I:

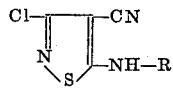

wherein R represents $COR_1$ or

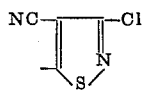

and $R_1$ represents an alkyl residue of 1–10 carbon atoms or phenyl.

These novel compounds are distinguished by their diverse activities. Aside from being excellent insecticides, they also exhibit significant herbicidal effects.

In the novel compounds of Formula I, $R_1$ is an alkyl residue or the phenyl group. Preferred alkyl residues are methyl, ethyl, n-propyl, i-propyl, n-, sec.-, iso-, and tert.-butyl, but also the higher homologs of up to 10 carbon atoms.

The novel compounds can be prepared in a simple manner. For example, to obtain 5-(3'-chloro-4'-cyano-isothiazolyl)-amino-3-chloro - 4 - cyano-isothiazole, there is reacted 3,5-dichloro-4-cyano-isothiazole with ammonia in a solvent, preferably dimethyl formamide. A preferred technique is to bubble ammonia into the reaction mixture for several hours, and then allow the reaction mixture to stand for several more hours. It is advantageous to conduct the reaction at somewhat elevated temperatures, for example, between about 40 and 80° C. In this reaction, the by-product 3-chloro-5-amino-4-cyano-isothiazole is obtained. The reaction product is worked up in a conventional manner, for example, by fractional crystallization and/or chromatographic separation techniques.

The compounds wherein R represents $COR_1$ can be obtained, for example, by acylation of 3-chloro-5-amino-4-cyano-isothiazole. This acylation process can be conducted in accordance with any of those conventional methods employed for the acylation of amino groups. Most advantageously, the reaction is carried out with the corresponding acid chlorides or anhydrides in organic solvents, particularly in dimethyl formamide or pyridine. The reaction can be conducted at room temperature. Normally, the temperature of the reaction mixture rises after the individual components are mixed together. For completing the reaction, however, it can be of advantage to heat the reaction mixture for a period of time to even higher temperatures up to the reflux temperature. The working-up process is conducted in a conventional manner. The 3-chloro-5-amino-4-cyano-isothiazole obtained during the production of 5-(3'-chloro-4' - cyano-isothiazolyl)-amino-3-chloro - 4 - cyano-isothiazole can be employed directly as an additional starting material.

With respect to the insecticidal effect, the novel compounds exhibit the great advantage that they are exclusively ingestive (stomach) poisons, in contradistinction to conventional insecticides. Thus, the novel compounds are neither effective as contact poisons nor as respiratory poisons. This selective effect has been previously unknown in insecticides, and now makes possible the combatting of specific insects with the useful fauna being spared.

Compounds were tested with respect to their insecticidal activity, for example, on *Musca domestica* (housefly) and *Blatta orientalis* (oriental cockroach). In the first case, the active agent to be tested was introduced, together with small amounts of emulsifiers and carriers into a milk-sugar solution, placed in feeding bowls permitting only oral ingestion by seven-day-old flies. The amount of the ingested active agent was calculated from the weight increase of the flies and the concentration of the above-mentioned solution. With the acid of a staggered series of concentrations, there can be determined after four hours the $LD_{50}$ and $LD_{95}$ values from the absorbed amounts of active agent and the mortality rate of the flies.

The stomach poison test on *Blatta orientalis* was conducted by applying the active agent, dissolved in acetone, onto one-half of a wafer having a diameter of 20 mm. This wafer was introduced, by its portion free of active agent, into a slot and offered as feed to hungry cockroaches. Here again, the substance to be tested was employed in a series of various dilutions. From the amounts of active agent and the percentage of cockroaches killed after seven days, the $LD_{50}$ and $LD_{95}$ values were graphically determined.

The results for two if the novel compounds are listed in the following table:

| Substance | Test on Mucsa in percent of active agent | | Test on Blatta in mg. | |
|---|---|---|---|---|
| | $LD_{50}$ | $LD_{95}$ | $LD_{50}$ | $LD_{95}$ |
| 3-chloro-5-acetyl-amino-4-cyano-isothiazole | 0.02 | 0.03 | 0.42 | 0.85 |
| 5-(3'-chloro-4'-cyano-isothiazolyl)-amino-3-chloro-4-cyano-isothiazole | 0.03 | 0.05 | 0.20 | 0.73 |

As herbicidal agents, the novel compounds are also highly selective in effect, thereby permitting the employment of the novel herbicidal agents in cultivated areas. Monocotyledonous plants, for example, exhibit, even in early development stages, a considerable resistance against the novel agents as compared to the dicotyledonous weeds.

Additional herbicidal agents can be added to the herbicidal substances of the present invention, since combination preparations are generally preferred to quickly eliminate a wide variety of undesirable plant life. Particularly advantageous are combinations with growth-promoting herbicides and/or growth or morpho-regulating agents. Among the growth-promoting herbicides, particularly important are the derivatives of the phenoxyalkane-carboxylic acids, for example, 2-methyl-4-chlorophenoxy-acetic acid, 2,4-dichlorophenoxy-acetic acid, 2,4,5-trichlorophenoxy-acetic acid, 2 - methyl-4-chlorophenoxy-propionic acid, and 2,4-dichlorophenoxy-propionic acid, as well as the salts and esters thereof. From the group of the morpho-regulators, of particular interest are the derivatives of fluorene-9-carboxylic acid, as well as the derivatives of 2-chloro or 2,7-dichloro-fluorenol-carboxylic acids. Good results are likewise attainable if there are added to the agents of this invention ammonium thiocyanate and/or ammonium sulfate.

To test the herbicidal activities of the compounds of this invention, the following tests were conducted, for example.

(I) SELECTIVE ACTIVITY IN COMBATTING WEEDS IN CULTIVATED AREAS (a) In cotton and soybeans Procedure.—The test plants were sowed in test bowls of 13 x 18 cm. (cultivated plants in rows, weeds areally) and pre-cultivated until the test stage was reached. The active agent was applied by spraying onto the leaf system, the cultivated plants being still in the seedleaf stage, whereas the weeds were in the 1- to 2-leaf stage. Respectively 10 ml. of an aqueous dilution series of a 50% sprayable powder of 3-chloro - 5 - acetylamino-4-cyano-isothiazole where applied onto 400 cm.² base area of a sprayed cone. The bowls were placed under open-air conditions until evaluation after three weeks. In the following Table I, the effect is symbolized as follows:

0=no effect
1=weak, transitory damage
2=moderately strong damage, of some duration, but recovery
3=strong persistent damage, recovery only very slow
4=very strong damage, practically eliminated
+=completely killed

TABLE I

| Plant | Evaluation | |
|---|---|---|
| | 0.05% | 0.1% |
| Cotton (Gossypium spec.) | 0 | 0 |
| Soybean (Glycine maxima) | 0 | 1 |
| Amaranth (Amaranthus retroflexus) | 4 | + |
| Nightshade (Solanum nigrum) | + | + |
| French Weed (Galinsoga parviflora) | + | + |
| Millet (Echinochlo crus-galli) | 0 | 3 |

From this Table I, it can be seen that in weeds a substantially stronger damage is observed than in the cultivated plants.

(b) In wheat and rice

In a corresponding manner, the effect of the active agent upon the below-mentioned weeds in cultivated stands of wheat and rice was tested. The respective stage of development of the test plants is listed in the right-hand columns of Table II (figures=number of leaves):

TABLE II

| Plant | Evaluation | | Stage of development at— | |
|---|---|---|---|---|
| | 0.05% | 0.1% | Spraying | Evaluation |
| Wheat (Triticum vulgare) | 0 | 0 | 3 | Stocking. |
| Rice (Oryza sativa) | 0 | 2 | 3 | Incipient stocking. |
| Amaranth (Amaranthus retroflexus) | + | + | 2 | 6. |
| Cleavers (Galium aparine) | + | + | ¹1 | ¹3-4. |
| Chickweed (Stellaria media) | + | + | 4 | 8. |
| Millet (Echinochola crus-galli) | 2 | 2 | 3 | 4-5. |

¹ Whorls.

(II) SPRAYING BELOW THE LEAVES UPON WEEDS IN CULTIVATED AREAS

Procedure.—Small-lot test (in the open), 50% sprayable powder

Beds overgrown with weeds were divided into lots of 5 x 1 m. Per 5 m.² lot, respectively 250 ml. of the 50% sprayable powder formulation, prepared in a series of aqueous dilutions, of 3-chloro-5-acetylamino-4-cyano-isothiazole were sprayed by means of a sprayer in such a manner that the leaf system of the cultivated plants remained extensively untreated (spraying below the leaves with 500 l./ha.). The effect was determined after three weeks and evaluated as set forth above. The results are listed in Table III. Here again, the selective activity is clearly demonstrated.

TABLE III

| Plant | Evaluation | | | Stage of development at spraying time |
|---|---|---|---|---|
| | 0.5% | 1.0% | 0.5% + 0.5% (wetting agent) | |
| Indian Corn (maize) (Zea mays) | 0 | 1 | 0 | 4-5 |
| Cotton (Gossypium spec.) | 1 | 1 | 1 | 6-8 |
| Soybean (Glycine maxima) | 0 | 1 | 1 | 3-5 |
| Amaranth (Amaranthus retroflexus) | 3 | + | 4 | 6-8 |
| Nightshade (Solanum nigrum) | + | + | + | 4-6 |
| French Weed (Galinsoga parviflora) | 4 | + | + | 4-5 |
| Chickweed (Stellaria media) | 3 | + | + | 6 |
| Small Nettle (Urtica urens) | + | + | + | 5-7 |
| Charlock (Sinapis arvensis) | 4 | + | + | 5-8 |

(III) SPRAYING OF A YOUNG LAWN OVERGROWN WITH WEEDS

Procedure.—Small-lot test (in the open), 50% sprayable powder

A test area was seeded with a mixture of the following grass seeds ("lawn mixture"): Arrhenaterum elatior, Holcus lanatus, Bromus inermis, Dactylis glomerata, Phleum pratense, Lolium perenne, Poa pratensis, Festuca rubra, Festuca ovina and Agrostis tenuis. After the germinated young grasses had developed about 3–4 small leaves, and the young weeds 3–6 secondary leaves, the area was sprayed with 500 ml. per 10 m.² (500 l./ha.) of an aqueous dilution of a 50% sprayable powder of 3-chloro-5-acetylamino-4-cyano-isothiazole. The effect was evaluated fourteen days after treatment.

TABLE IV

| Plants | Evaluation | | |
|---|---|---|---|
| | 0.1% | 0.2% | 0.5% |
| Mixture of grasses | 0 | 1 | 2 |
| French Weed (*Galinsoga parviflora*) | + | + | + |
| Small Nettle (*Urtica urens*) | 4 | + | + |
| Chickweed (*Stellaria media*) | 4 | + | + |
| Shepherd's Purse (*Capsella bursa-pastoris*) | 3 | + | + |
| White Goosefoot (*Chenopodium album*) | 3 | 4 | + |
| Stalk-encompassing Deadnettle (*Lamium amplexicaule*) | 3 | 4 | + |

The selective activity of the herbicides of this invention is again clearly illustrated.

(IV) POST-GERMINATION SPRAYING

Camomile plants (*Matricaria chamomilla*) were sprayed with predetermined amounts in containers shortly before the incipient elongation of the pedicel, underneath a spraying device, with the following preparations:

(A) A series of dilutions of a 50% sprayable powder of 3-chloro-5-acetylamino-4-cyano-isothiazole.

(B) Solution A with an addition of 0.05% ammonium thiocyanate.

The evaluation was conducted after 7 and after 21 days, the following evaluation system being used:

0 = no effect
1 = weak effect (necroses and chloroses of feathered leaves)
2 = moderate effect (dying of leaves up to 33%)
3 = strong effect (dying of leaves up to 75%)
4 = very strong effect (almost complete dying of the entire plant)
+ = completely killed

TABLE V

| Preparation | In percent | Concentration | |
|---|---|---|---|
| | | After 7 days | After 21 days |
| A | 0.04 | 1 | 3 |
| A | 0.1 | 2–3 | 4 |
| B | 0.04(¹+0.05) | 2 | 3–4 |
| B | 0.1(¹+0.05) | 3–4 | + |
| Ammonium thiocyanate (blind test) | ¹ 0.05 | 0 | 0 |
| Controls | | 0 | 0 |

¹ Ammonium thiocyanate.

The above table shows the synergistic effect between a herbicidal agent of this invention and ammonium thiocyanate. With increasing concentrations of ammonium thiocyanate, the resultant activating effect becomes stronger. Similar results are obtained with ammonium sulfate. In general, the proportion of ammonium sulfate or thiocyanate to the herbicide of this invention should be about 0.01:1 to 100:1, preferably 0.1:1 to 10:1, respectively.

The novel compounds can be processed together with all additives and carrier materials conventional to herbicidal and insecticidal composition. For insecticidal agents, for example, there are particularly employed sprayable powders, bait formulations, granulates and dispersions. The weight content of active agent of the bait preparations and the granulates ranges generally between 5 and 10%, whereas the sprayable powders contain about 5–95%, preferably 50–90%, and the emulsion concentrates about 30–95%, preferably about 50–95% of the active substance. The novel agents can, of course, also be combined with other insecticides, if desired, and employed in that form.

The sprayable powders, bait formulations and granulates are characterized by the combination of active agent and particulate solids. The dispersions are characterized by the combination of active agent and water together with organic or inorganic thickening agents as well as wetting and/or dispersing agents.

The novel compounds can be processed into all conventional forms of preparations associated with plant protective agents or plant combatting agents. Thus, the agents can be employed in solid or liquid form, by spraying, pouring, scattering, or dusting, in accordance with the processes conventional in the plant protection art. Additives and fillers used in this connection are the conventional ones, such as, for example, bole, kaolin, bentonite, ground shale, talc, chalk, dolomite, or kieselguhr, if solid preparations are concerned. For liquid formulations, xylene, solvent naphtha, petroleum, acetone, cyclohexane, dimethyl formamide, or aliphatic alcohols are preferably used as solvents. The emulsion concentrates thus prepared can be marketed as such. Prior to use, the emulsion concentrates are diluted with water in the usual manner. Due to the low solubility of the active agents in organic solvents, it is, however, preferable to formulate them as aqueous dispersions. As organic thickening agents for such dispersions, the following can, for example, be used: methyl, ethyl carboxymethyl and hydroxyethyl cellulose, tragacanth, dextrines, alginic acids and their salts, polyvinyl alcohol. Typical inorganic thickening agents are bentonite, attaclay and hectorite. The total content of active agent in these compositions ranges generally between 5 and 95%.

An especially favorable herbicidal efficiency is obtained by the application of the new compounds of the above Formula I or the isomeric compounds in combination with wetting and/or dispersing agents. The herbicidal efficiency of the new compounds is inordinately increased by the wetting and dispersing agents. In this preferred combination all wetting and dispersing agents, which are usually applied in pesticides, can be used, preferably in an amount of about 0.01 to 1% calculated on the basis of the preparation form for use. Suitable wetting and/or dispersing agents are alkyl benzene sulfonates, alkyl naphthalene sulfonates, polyoxyethylene esters of fatty and resinic acids, alkyl phenol polyglycol ethers.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE A 16 g. 3-chloro-5-amino-4-cyano-isothiazole are dissolved in 75 ml. pyridine and mixed dropwise, under stirring, with 16 g. acetyl chloride. During this procedure, the reaction solution heats up to about 60° C. The reaction mixture is then heated additionally for one hour on a steam bath, and then poured into water. The crystals precipitating after trituration and allowing the reaction solution to stand for some time are vacuum-filtered and recrystallized from ethanol with the addition of active charcoal. There is obtained 3-chloro-5-acetylamino-4-cyano-isothiazole, M.P. 225–228° C.

When employing benzoyl chloride in place of acetyl chloride, there is obtained 3-chloro-5-benzoylamino-4-cyano-isothiazole in a corresponding manner.

EXAMPLE B 80 g. 3-chloro-5-amino-4-cyano-isothiazole are dissolved in the cold state in 200 ml. dimethyl formamide and mixed dropwise, under stirring, with 80 g. acetyl chloride. The temperature of the solution reaches 40° C. during this procedure. After the mixing is terminated, the reaction solution is heated for one hour on a steam bath and then allowed to stand overnight. The precipitated crystals of 3-chloro-5-acetylamino-4-cyano-isothiazole are vacuum-filtered and recrystallized from ethanol with the addition of activated charcoal; M.P. 227–229° C.

Analogously, there are obtained, when using the corresponding acid chlorides in place of acetyl chloride, 3-chloro - 5 - butyrylamino - 4-cyano-isothiazole and 3-chloro-5-caproylamino-4-cyano-isothiazole.

EXAMPLE C

A turbulent stream of ammonia gas is introduced into a solution of 600 g. 3,5 - dichloro - 4 - cyano-isothiazole in 1400 ml. dimethyl formamide for 5 hours at 50–60° C. After allowing the reaction mixture to stand overnight, precipitated ammonium chloride is vacuum-filtered, and the filtrate is concentrated under vacuum. The oily residue is made to crystallize by adding water and vacuum-filtered. The aqueous filtrate is again concentrated, and the remaining oil is once again mixed with water. The combined crystallized products are recrystallized from 96% ethanol with the addition of activated charcoal. The first fraction obtained is 142 g. 5 - amino - 3 - chloro-4-cyano-isothiazole. The mother liquor is concentrated in several stages, and the crystals which precipitate are vacuum-filtered. The last residue is an oil. The combined crystallized products obtained from the mother liquor are dried and recrystallized from ethyl acetate. There are first obtained 94 g. 5 - (3' - chloro - 4'-cyano-isothiazolyl)-amino-3-chloro-4-cyano-isothiazole, M.P. 243° C. By gentle concentration of the mother liquor, there are obtained an additional 64 g., M.P. 240–242° C. The filtrate is again concentrated, and the residue is recrystallized from 96% ethanol; there are additionally obtained 67 g. of 5-amino-3 - chloro - 4 - cyano-isothiazole (M.P. 212–214° C.). The residual mother liquor is column-chromatographed over silica gel, ethyl acetate being used as the elution agent. There are additionally obtained 45 g. 5-amino-3-chloro-4 - cyano - isothiazole and 58 g. 5-(3'-chloro-4'-cyano-isothiazolyl)-amino-3-chloro-4-cyano-isothiazole.

The yield of 5 - (3' - chloro - 4'-cyano-isothiazolyl)-amino - 3 - chloro - 4-cyano-isothiazole amounts to 216 g.=42.6% of theory.

There are obtained, as a by-product, 254 g. 5-amino-3-chloro-4-cyano-isothiazole.

The following examples illustrate some of the forms in which the active ingredients of this invention can be applied.

EXAMPLE 1

Sprayable powder: Percent
- 3 - chloro - 5-acetylamino-4-cyano-isothiazole _ 50
- Alkyl naphthalene sulfonate _____ 0.5
- Sulfite waste liquor powder _____ 10
- Silicic acid _____ 1
- Bole _____ 38.5

EXAMPLE 2

Sprayable powder: Percent
- 5 - (3' - chloro - 4'-cyano-isothiazolyl)-amino-3 - chloro-4-cyano-isothiazole _____ 75
- Oleic acid-N-methyl taurine _____ 8
- Chalk _____ 17

EXAMPLE 3

Powdered bait: Percent
- 3-chloro-5-acetylamino-4-cyano-isothiazole ____ 5
- Talc _____ 10
- Bran _____ 85

EXAMPLE 4

Granulate: Percent
- 5 - (3' - chloro - 4'-cyano-isothiazolyl)-amino-3 - chloro-4-cyano-isothiazole _____ 5
- Gelatin _____ 3
- Bole _____ 10
- Wheat flour _____ 5
- Bran _____ 77

EXAMPLE 5

Sprayable powder: Percent
- 3-chloro-5-butyrylamino-4-cyano-isothiazole __ 50
- Alkyl naphthalene sulfonate _____ 0.5
- Sulfite waste liquor powder _____ 10
- Silicic acid _____ 1
- Bole _____ 38.5

EXAMPLE 6

Sprayable powder: Percent
- 3-chloro-5-benzoylamino-4-cyano-isothiazole __ 75
- Oleic acid-N-methyl taurine _____ 8
- Chalk _____ 17

EXAMPLE 7

Powdered bait: Percent
- 3-chloro-5-caprimylamino-4-cyano-isothiazole _ 5
- Talc _____ 10
- Bran _____ 85

EXAMPLE 8

Sprayable powder: Percent
- 3-chloro-5-acetylamino-4-cyano-isothiazole ____ 20
- 2 - methyl - 4-chloro-phenoxyacetic acid isooctyl ester _____ 30
- Precipitated silicic acid _____ 40
- Alkyl phenol polyglycol ether _____ 10

EXAMPLE 9

Sprayable powder: Percent
- 3-chloro-5-acetylamino-4-cyano-isothiazole ___ 60
- 2,4-dichlorophenoxyacetic acid sodium salt ____ 20
- Alkyl benzenesulfonate _____ 1
- Sulfite powder _____ 5
- Kieselguhr _____ 14

EXAMPLE 10

Sprayable powder: Percent
- 3-chloro-5-acetylamino-4-cyano-isothiazole ____ 40
- 9 - hydroxyfluorene - 9-carboxylic acid n-butyl ester _____ 40
- Oleic acid-N-methyl taurine _____ 6
- Precipitated aluminum silicate _____ 14

EXAMPLE 11

Sprayable powder: Percent
- 5 - (3' - chloro - 4'-cyano-isothiazolyl)-amino-3 - chloro-4-cyano-isothiazole _____ 30
- 2 - methyl - 4 - chlorophenoxypropionic acid isooctyl ester _____ 20
- 2 - chloro - 9 - hydroxyfluorene-9-carboxylic acid methyl ester _____ 10
- Alkyl sulfonate _____ 1
- Sulfite powder _____ 6
- Precipitated calcium silicate _____ 33

EXAMPLE 12

Dispersion: Percent
- 3-chloro-5-acetylamino-4-cyano-isothiazole ___ 30.0
- Sodium salt of 2,4-dichlorophenoxypropionic acid _____ 10.0
- Carboxymethyl cellulose _____ 1.0
- Bentonite _____ 1.0
- Polyoxyethylene esters of fatty and resinic acids _____ 1.5
- Water _____ 56.5

EXAMPLE 13

Dispersion: Percent
- 5-(3'-chloro - 4' - cyano-isothiazolyl)-amino-3-chloro-4-cyano-isothiazole _____ 30.0
- 2-chloro-9-hydroxyfluorene - 9 - carboxylic acid methyl ester _____ 10.0
- Carboxymethyl cellulose _____ 1.0
- Bentonite _____ 1.5
- Alkyl phenol polyglycol ether _____ 2.5
- Water _____ 55.0

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be within the full range of equivalence of the following claims.

What is claimed is:

1. A compound of the formula:

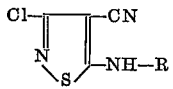

wherein R represents $COR_1$ or

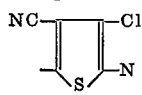

and $R_1$ represents an alkyl residue of 1–10 carbon atoms or phenyl.

2. A compound as defined by claim 1 wherein R represents $COR_1$.

3. A compound as defined by claim 1 wherein said compound is 3-chloro-5-acetylamino-4-cyano-isothiazole.

4. A compound as defined by claim 1 wherein said compound is 3-chloro-5-benzoylamino-4-cyano-isothiazole.

5. A compound as defined by claim 1 wherein said compound is 3-chloro-5-butyrylamino-4-cyano-isothiazole.

6. A compound as defined by claim 1 wherein said compound is 3-chloro-5-caprinoylamino-4-cyano-isothiazole.

7. A compound as defined by claim 1 wherein said compound is 5-(3'-chloro-4'-cyano-isothiazolyl)-amino-3-chloro-4-cyano-isothiazole.

References Cited
UNITED STATES PATENTS

| | | | |
|---|---|---|---|
| 3,155,678 | 11/1964 | Hatchard | 260—306.8 |
| 3,337,550 | 8/1967 | Yates et al. | 71—93 |
| 3,374,082 | 3/1968 | Lemin | 71—90 |

ALTON D. ROLLINS, Primary Examiner

U.S. Cl. X.R.

71—17, 90; 424—270